(12) United States Patent
Sanji (10) Patent No.: US 7,975,571 B2
(45) Date of Patent: Jul. 12, 2011

(54) HYBRID DRIVE DEVICE

(75) Inventor: Hiroaki Sanji, Anjo (JP)

(73) Assignee: Aisin AW Co., Ltd., Tokyo (JP)

( * ) Notice: Subject to any disclaimer, the term of this patent is extended or adjusted under 35 U.S.C. 154(b) by 400 days.

(21) Appl. No.: 12/251,886

(22) Filed: Oct. 15, 2008

(65) Prior Publication Data

US 2009/0105040 A1    Apr. 23, 2009

(30) Foreign Application Priority Data

Oct. 19, 2007 (JP) ................................ 2007-272813

(51) Int. Cl.
*F16H 37/06* (2006.01)
(52) U.S. Cl. ........................................................ 74/661
(58) Field of Classification Search .................... 74/661; 475/5; 477/5
See application file for complete search history.

(56) References Cited

U.S. PATENT DOCUMENTS

| 5,875,691 | A | 3/1999 | Hata et al. | |
| 6,656,083 | B2 * | 12/2003 | Esaki | 477/5 |
| 6,685,591 | B2 * | 2/2004 | Hanyu et al. | 475/5 |
| 6,692,405 | B2 * | 2/2004 | Minowa et al. | 477/5 |
| 2007/0187160 | A1 | 8/2007 | Raoul | |
| 2007/0289833 | A1 | 12/2007 | Chapelon et al. | |
| 2008/0093135 | A1 | 4/2008 | Nomura et al. | |

FOREIGN PATENT DOCUMENTS

| JP | 9-156388 A | 6/1997 |
| JP | 2003-063261 A | 3/2003 |
| JP | 2004-001708 A | 1/2004 |
| JP | 2004-306646 A | 11/2004 |
| WO | 2005/110795 A1 | 11/2005 |
| WO | 2005/123431 A1 | 12/2005 |
| WO | 2006/054661 A1 | 5/2006 |

OTHER PUBLICATIONS

International Search Report for corresponding International Patent Application No. PCT/JP2008/061357 mailed Sep. 22, 2008.

* cited by examiner

*Primary Examiner* — Dirk Wright
(74) *Attorney, Agent, or Firm* — Sughrue Mion, PLLC (57) ABSTRACT

An output shaft of a rotating electrical machine and a drive device input shaft are disposed at different shaft center positions. A first gear meshing with a second gear provided on the output shaft of the rotating electrical machine for reducing rotation and transmitting the reduced rotation to a transmission input shaft is provided coaxially with the drive device input shaft, and at least a part of the clutch is disposed at an inner-diameter-side position so as to overlap a gear portion of the first gear in an axial direction.

20 Claims, 3 Drawing Sheets

HYBRID DRIVE DEVICE

INCORPORATION BY REFERENCE

This Application claims priority from Japanese Patent Application No. 2007-272813, filed on Oct. 19, 2007, the disclosure, including the specification, drawings and abstract, of which is incorporated herein by reference in its entirety.

BACKGROUND OF THE INVENTION

1. Field of the Invention

The present invention relates to a hybrid drive device including as driving sources an engine (for example, an internal combustion engine such as a gasoline engine and a diesel engine) and a rotating electrical machine (including, for example, a rotating electrical machine serving as a motor for receiving electric power supply and generating driving force (for example, rotational driving force), a rotating electrical machine serving as a generator for receiving driving force and generating electric power, or a rotating electrical machine serving either as a motor or a generator depending on the operation state) and structured to obtain driving force from one or both of the engine and the rotating electrical machine, perform shifting in a transmission, and transmit the resultant driving force to driving wheels so that a vehicle travels.

2. Description of the Related Art

The applicants introduced a hybrid drive device described in Japanese Patent Application Publication No. JP-A-2004-001708 as an example of a hybrid drive device. An object of the technology disclosed in JP-A-2004-001708 is to provide a hybrid vehicle drive device having a structure with reduced a dimension in an axial direction as compared to a related device without increasing a dimension in a radial direction, while using an engine and a motor, which are connected together as a power source.

The hybrid vehicle drive device described in Japanese Patent Application Publication No. JP-A-2004-001708 includes an annular motor centering around the axis of an engine output shaft, a starting device for transmitting driving force from the engine and motor to a transmission downstream side, and a transmission for receiving the driving force of the engine and motor through the starting device. In this drive device, the starting device includes a starting clutch and a damper device, which have an annular shape centered around the aforementioned axis and are arranged spaced apart from each other at a predetermined distance in an axial direction. The starting clutch is provided so that at least a part of the starting clutch overlaps the motor in an axial direction, and the starting clutch is located on an inner-diameter side of the damper device.

As shown in JP-A-2004-001708, this technology uses a structure in which a rotor of a rotating electrical machine is fixed to an outer-diameter part of a clutch hub and rotation of the rotating electrical machine is transmitted directly to an intermediate shaft. When the clutch is in an engaged state, the engine output is also transmitted through the clutch to the clutch hub of the clutch and transmitted to the intermediate shaft.

A hybrid drive device including two kinds of drive sources (an engine and a single rotating electrical machine) and a transmission has originally been developed in order that the occupied space required to mount the hybrid drive device can be reduced as much as possible. As in the related art described above, however, in the case of using the structure in which the output of the driving source (especially the rotating electrical machine) is directly applied to the transmission and transmitted to driving wheels after shifting in the transmission, the size of the rotating electrical machine itself tends to be increased depending on the driving torque required for traveling, which may be against the object of reducing the size of the device.

Moreover, in the case of using the structure in which rotation from both the engine and the rotating electrical machine is reduced in speed in the transmission, the size of the transmission needs to be increased, providing room for improvement.

In order to increase the torque that is generated in the rotating electrical machine, it is mainly necessary to increase the axial length of the stator and rotor of the rotating electrical machine or increase the diameter of the rotating electrical machine so that the torque that can be generated is increased. However, in a hybrid drive device of the present application that is preferably used in, for example, an FF (front engine-front wheel drive) type, the space that can be occupied by the hybrid drive device is limited, and it is therefore difficult to take measures to increase the torque by significantly increasing the diameter of the rotating electrical machine. Moreover, in the case where the axial length of the rotating electrical machine is increased, the axial length of the hybrid drive device (the length in the left-right direction in FIG. 1) becomes too long, which is not preferable.

SUMMARY OF THE INVENTION

It is an object of the present invention to obtain a hybrid drive device including both an engine and a rotating electrical machine as driving sources, for receiving rotational driving force from one or both of the engine and the rotating electrical machine, performing shifting in a transmission, and transmitting the resultant rotational driving force to driving wheels, in which sufficient traveling driving force can be obtained even when a relatively small rotating electrical machine is used, and the overall size of the hybrid drive device can be reduced as much as possible.

In order to achieve the above object, a hybrid drive device includes: an input shaft connected to an engine; a rotating electrical machine; a shift output mechanism for shifting rotation of an intermediate shaft provided coaxially with the input shaft and transmitting the resultant rotation to an axle; and a clutch for connecting/disconnecting drive transmission between the input shaft and the intermediate shaft, and has the following characteristic structure: an output shaft of the rotating electrical machine and the input shaft are disposed at different shaft center positions, a first gear meshing with a second gear provided on the output shaft of the rotating electrical machine for reducing rotation and transmitting the reduced rotation to the intermediate shaft is provided coaxially with the input shaft, and at least a part of the clutch is disposed at an inner-diameter-side position so as to overlap a gear portion of the first gear in an axial direction.

The word "connect" indicates a state in which driving force can be transmitted between members that are connected, and includes not only a state in which both members are directly connected to each other, but also a state in which both members are indirectly connected to each other through another member.

In this hybrid drive device, drive transmission between the rotating electrical machine and the transmission is performed through the second gear and the first gear. Drive transmission from the input shaft to which the engine driving force is transmitted to the transmission, on the other hand, is performed through the clutch according to the engagement/disengagement state of the clutch. This structure does not change from a conventional structure.

Drive transmission from the output shaft of the rotating electrical machine to the intermediate shaft in this hybrid drive device involves speed reduction, which causes an increase in torque. A smaller rotating electrical machine can therefore be used as compared to the structure in which output of the rotating electrical machine is directly transmitted without reducing the rotation speed. Moreover, the input shaft and the output shaft of the rotating electrical machine having the second gear thereon are provided at different shaft center positions, and the first gear is provided coaxially with the input shaft and the intermediate shaft. The rotating electrical machine can therefore be disposed at an appropriate phase position around the input shaft (for example, an appropriate phase position determined in view of the position of a differential gear so as not to interfere with the position of the differential gear). In other words, the hybrid drive device can be structured according to the shape of the occupied space of the device that can be allowed in a vehicle that uses the hybrid drive device.

Moreover, since the first gear is used to reduce the speed of the driving force of the rotating electrical machine, large radial load is applied to the first gear. Bearing support of the first gear therefore needs to be implemented in view of this problem. Since the clutch is located on the inner-diameter side and integrated with the first gear so as to overlap the first gear in an axial direction, the first gear can be satisfactorily supported while suppressing influences on an axial dimension.

In the above described structure, it is preferable that at least a part of the first gear forms the clutch.

In this structure, the first gear and the clutch have a common member. The use of a common member in the first gear and the clutch enables a more compact structure to be implemented at lower cost as compared to the case where separate members are used. In other words, the object of the hybrid drive device of the present application can be satisfactorily achieved.

In order to achieve the above structure, it is preferable that the first gear includes an input-shaft-side radially extending portion having its inner-diameter-side part rotatably supported by the input shaft and extending in a radial direction, an intermediate-shaft-side radially extending portion having its inner-diameter-side part connected to the intermediate shaft and extending in a radial direction, and a connecting portion that connects respective outer-diameter sides of the input-shaft-side radially extending portion and the intermediate-shaft-side radially extending portion to each other in an axial direction, and the gear portion that meshes with the second gear is formed in an outer-diameter part of the connecting portion.

In this structure, two portions of the first gear, that is, the input-shaft-side radially extending portion and the intermediate-shaft-side radially extending portion, are used to support the first gear from the sides of the input shaft side and the intermediate shaft which are provided coaxially. In the inner-diameter-side part of the gear which normally has a larger pitch diameter in order to implement speed reduction, a space is formed between these two extending portions and this space can be utilized.

It is preferable to use the following structure: a clutch drum connected to the input shaft is inserted into an internal space surrounded by the input-shaft-side radially extending portion, the intermediate-shaft-side radially extending portion, and the connecting portion, the intermediate-shaft-side radially extending portion is structured as a clutch hub, and a friction plate and a piston are disposed between the clutch drum and the clutch hub, whereby the clutch is structured. In this structure, the clutch that is an essential element for the hybrid drive device of the present application can be appropriately accommodated and disposed in this space. Moreover, a reliable support state of the first gear can be easily implemented.

Regarding support of the first gear that is unique to the present application, it is preferable that the hybrid drive device further includes a separation wall through which the input shaft penetrates, for dividing a space within a case in an axial direction, and a fixing member different from the separation wall, and the fixing member is provided on an more output end side of the input shaft than the separation wall. It is also preferable that the first gear has its one side supported by a first rotational bearing fixed to the separation wall and the other side supported by a second rotational bearing fixed to the fixing member.

In this structure, a pair of rotational bearings (the first rotational bearing and the second rotational bearing) that are respectively fixed to the separation wall and the fixing member that is provided at a different axial position (on the output end side) from that of the separation wall are provided in order to support the first gear. With the pair of rotational bearings, the first gear can be reliably and easily supported from both axial sides.

In the structure using the pair of rotational bearings (the first rotational bearing and the second rotational bearing), it is preferable to use the following structure for the first rotational bearing: the hybrid drive device further includes a damper for absorbing rotational vibration of the engine and transmitting power to the input shaft, the first rotational bearing is provided in a recess formed in the separation wall so as to protrude toward an input end side of the input shaft, and the recess is provided at an inner-diameter-side position that overlaps a part of the damper in an axial direction.

In this structure, the first rotational bearing is disposed in the recess of the separation wall and the recess of the separation wall is provided so as to overlap the damper member in an axial direction on the inner periphery side of the damper. An axial space can thus be shared by each element, whereby further reduction in size in the axial direction can be achieved.

On the other hand, it is preferable to use the following structure for the second rotational bearing: the second rotational bearing is provided at such a position on an inner-diameter side that overlaps the friction plate of the clutch in an axial direction.

The clutch friction plate is generally likely to occupy a relatively long length in an axial direction. In this structure, however, the second rotational bearing is provided on the inner-diameter side of the disposed position of the clutch friction plate so as to overlap the clutch friction plate in the axial direction. Since the space in the axial direction is shared by the two members, further reduction in size in the axial direction can be achieved.

Regarding the separation wall described above, the separation wall may be structured so as to be insertable into the case from a side of an engine mounting face, and may be fixed to the case in an axial direction. With this structure, assembling of the separation wall to the case can be implemented easily and quickly.

Moreover, providing the axle extending parallel to the input shaft as a separate shaft from the input shaft described above can contribute to reduction in size in the axial direction of the hybrid drive device.

DETAILED DESCRIPTION OF THE EXEMPLARY EMBODIMENTS

Hereinafter, an exemplary embodiment of a hybrid drive device HV according to the present application will be described with reference to the accompanying drawings.

Figure 1:
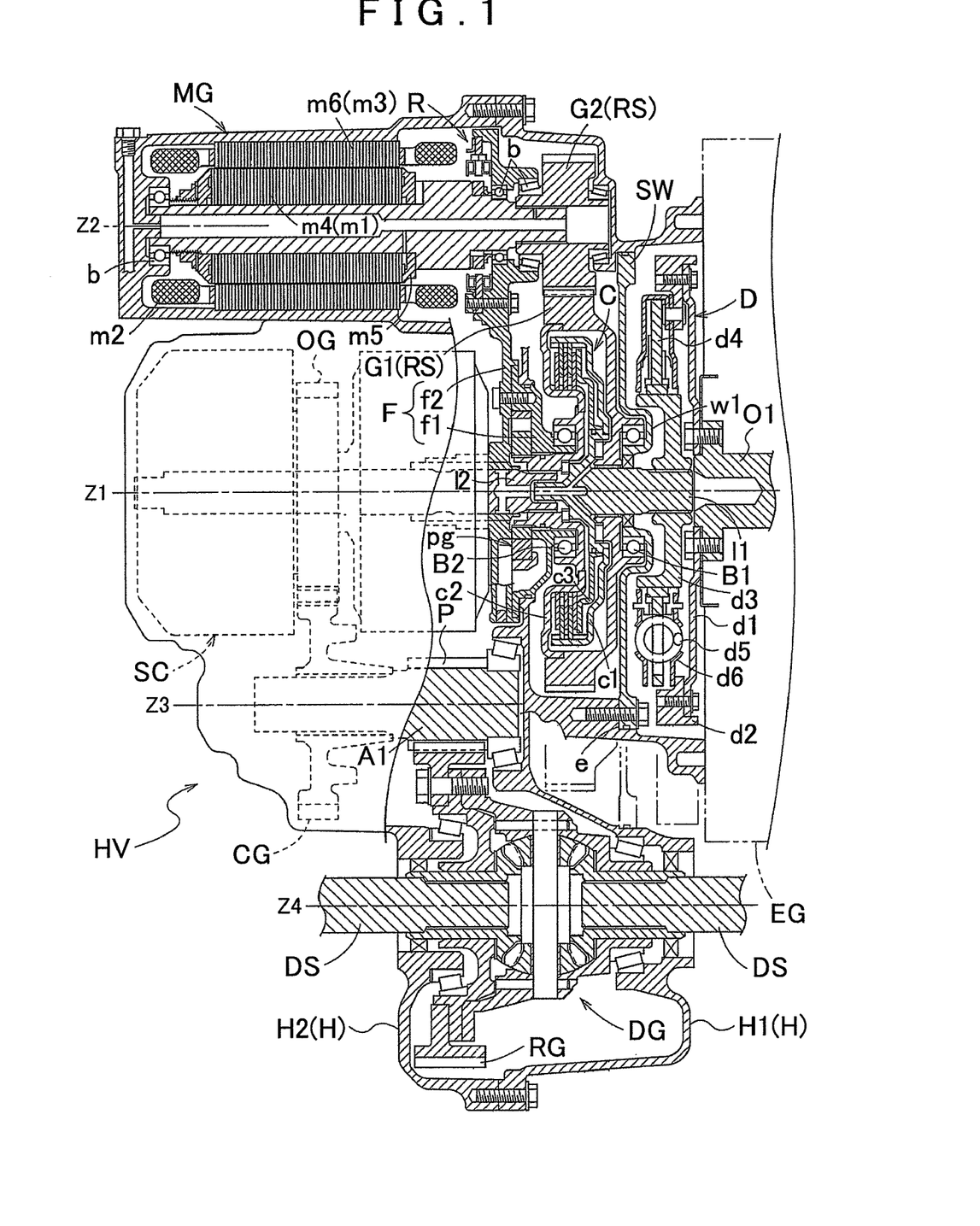
FIG. 1 is a cross-sectional view showing a structure of a hybrid drive device according to an exemplary embodiment of the present application.
Figure 2:
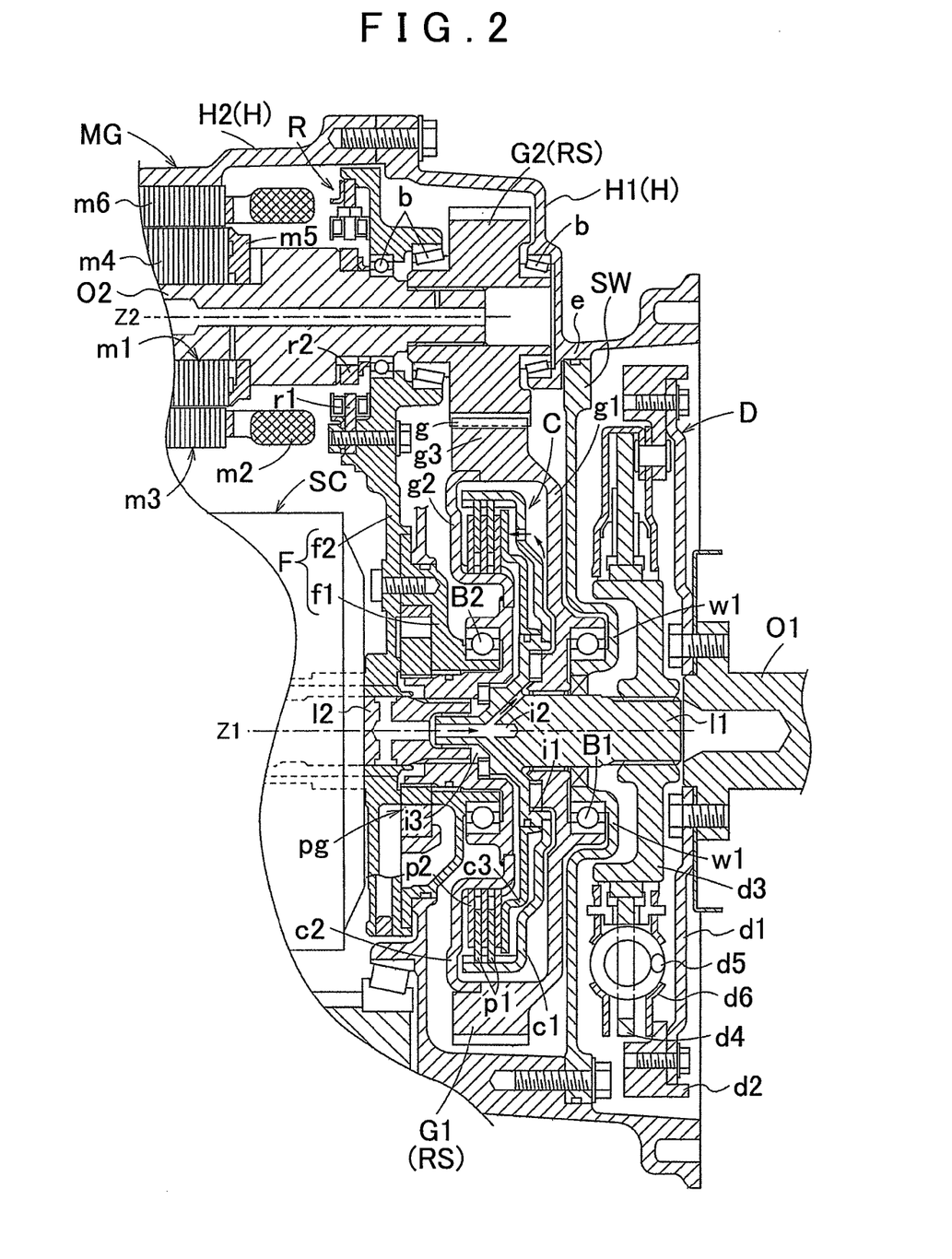
FIG. 2 is a cross-sectional view showing a structure of a main part of the hybrid drive device according to an exemplary embodiment of the present application.
Figure 3:
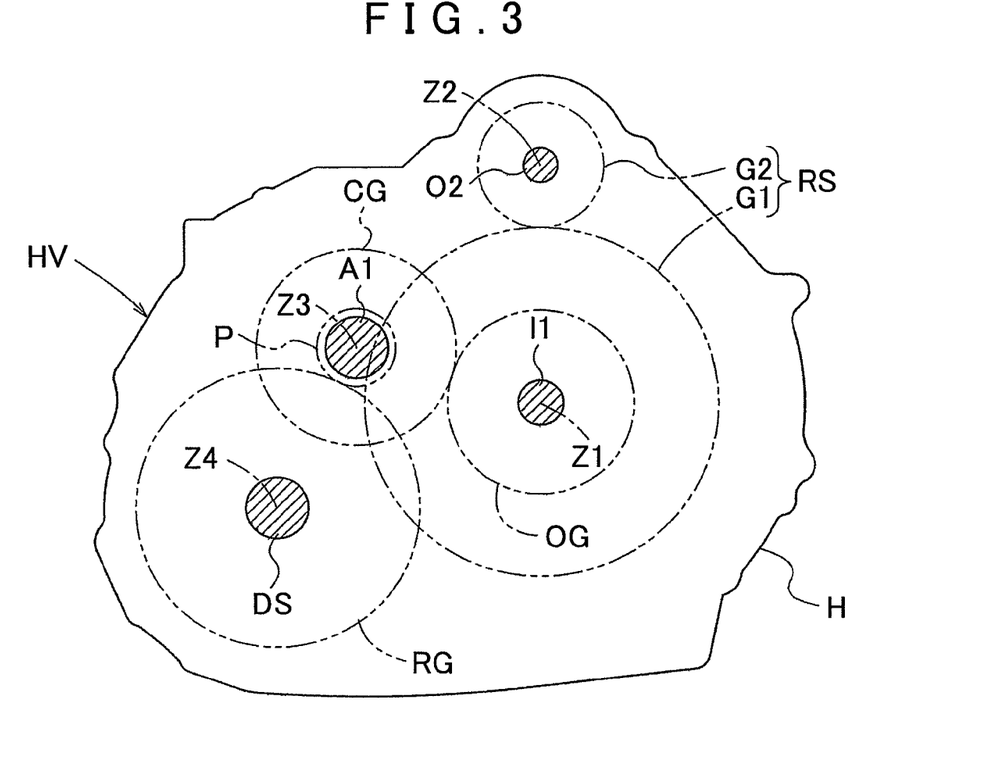
FIG. 3 is a side view showing an arrangement of main devices of the hybrid drive device according to an exemplary embodiment of the present application.
Figure 4:
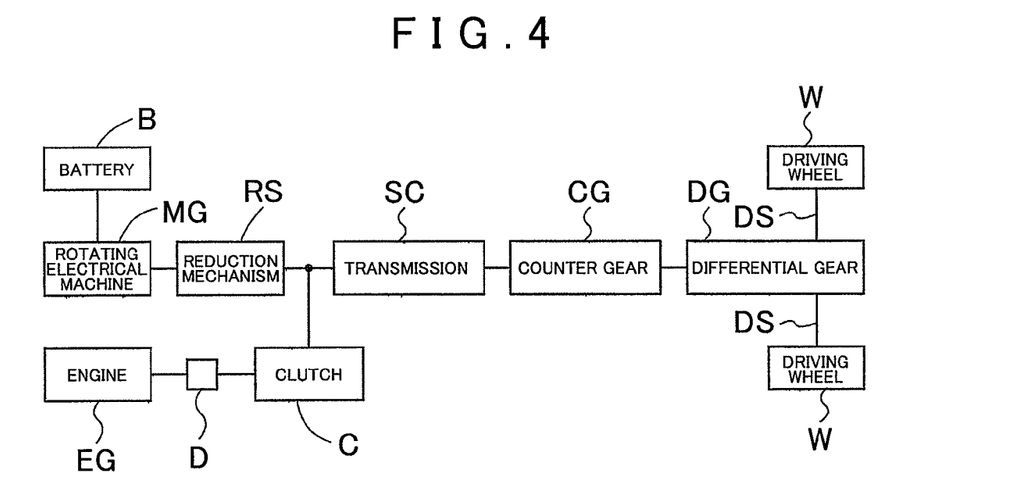
FIG. 4 is a diagram schematically showing a drive transmission system of the hybrid drive device according to an exemplary embodiment of the present application.

FIGS. 1 and 2 are cross-sectional views showing a structure of the hybrid drive device HV. FIG. 3 shows an arrangement of main devices when viewed in an axial direction. FIG. 4 is a schematic diagram of a drive transmission system used in the hybrid drive device HV.

A vehicle including this hybrid drive device HV includes an engine EG and a rotating electrical machine MG as driving sources. The vehicle travels by shifting the rotational driving force received from the engine EG and the rotating electrical machine MG in a transmission SC and transmitting the shifted output to driving wheels W through a counter gear CG and a differential gear DG.

As schematically shown in FIG. 4, the rotating electrical machine MG is drive-connected to the transmission SC through a reduction mechanism RS, and the engine EG is drive-connected to the transmission SC through a damper D and a clutch C. This drive transmission system is therefore structured as follows: when the clutch C is in a disengaged state, the rotating electrical machine MG serves as a motor so that motor traveling can be realized; in braking operation, the rotating electrical machine MG serves as a generator so that a battery B electrically connected to the rotating electrical machine MG can be charged. When the clutch C is in an engaged state, on the other hand, the respective driving forces from the rotating electrical machine MG and the engine EG are transmitted to the transmission SC so that the vehicle can travel by the driving forces obtained from both driving sources.

FIG. 1 shows details of the hybrid drive device HV according to an exemplary embodiment of the present application, and shows an arrangement and connection of the engine EG, the rotating electrical machine MG, a drive device input shaft I1, the clutch C, the transmission SC, a counter shaft A1 having the counter gear CG disposed thereon, and the differential gear DG. FIG. 2 shows a detailed structure of a region around the rotating electrical machine MG and the drive device input shaft I1.

The hybrid drive device HV includes the drive device input shaft I1 drive-connected to the engine EG through the damper D, the rotating electrical machine MG having a different shaft center from that of the drive device input shaft I1, the transmission SC provided coaxially with the drive device input shaft I1, and the counter shaft A1 provided at a different shaft center position from the respective shaft center positions of the rotating electrical machine MG and the drive device input shaft I1.

A case of the hybrid drive device HV includes the following two cases: a clutch/damper case H1 disposed on the rear side of the device (on the engine side; on the right side in FIG. 1) for accommodating a second gear G2 of the rotating electrical machine MG, a first gear G1 that is unique to the present application, the clutch C formed therewith, and the damper D; and a transmission/rotating electrical machine case H2 disposed on the front side of the device (on the left side in FIG. 1) for accommodating approximately the entire transmission SC and the rotating electrical machine MG. In this example, as shown in the figure, the clutch/damper case H1 is bolt-connected to the engine side of the transmission/rotating electrical machine case H2.

The space formed in the case with the clutch/damper case H1 and the transmission/rotating electrical machine case H2 connected together is divided into the following three spaces sequentially from the engine side: a first space in which the damper D is accommodated; a second space in which the first gear G1 that will be described in detail below and the second gear G2 of the rotating electrical machine MG are accommodated; and a third space in which the transmission SC is disposed. A separation wall SW for separating these spaces from each other and a fixing member F are provided.

As can be seen from FIGS. 1 and 2, the separation wall SW is structured so that the separation wall SW is insertable from an engine-side opening of the clutch/damper case H1 and so that the separation wall SW is bolt-fixed from the engine opening side to a stepped portion e provided on an inner peripheral surface of the clutch/damper case H1. The drive device input shaft I1 penetrates through the separation wall SW, and the separation wall SW isolates an input end side (engine side) of the drive device input shaft I1 from an output end side (transmission side) thereof.

As can be seen from FIGS. 1 and 2, the fixing member F is formed by a pair of members f1, f2 bolt-connected to each other. The fixing member F forms a pump body, and is structured so as to rotatably support at its one end an output shaft O2 of the rotating electrical machine MG.

One of the pair of pump body forming members f1, f2 (the pump body forming member f1 on the drive device input shaft side) is structured so as to be inserted into a transmission-side opening of the clutch/damper case H1. Although not shown in the figure, this fixing member F is structured so as to be fixed to the case H by bolt-connecting the other of the pair of pump body forming members f1, f2 (the pump body forming member f2 on the transmission side) to the transmission/rotating electrical machine case H2. A pump gear pg that rotates integrally with the first gear G1 described below is disposed in a pump chamber. In the hybrid drive device HV of the present application, a predetermined oil pressure can therefore be obtained by rotation of the rotating electrical machine MG.

As can be seen from FIG. 2, the other of the pump body forming member (the pump body forming member f2 on the transmission side) is structured as follows: an outer-diameter-side part (a part on the disposed side of the rotating electrical machine) thereof extends to a position in the vicinity of the inner surface of the case. In the outer-diameter-side part, the other pump body forming member rotatably supports one side (engine side) of the output shaft O2 of the rotating electrical machine MG. In this outer-diameter-side part, the other of the pump body forming member also rotatably supports one end of the second gear G2 spline-connected to the output shaft O2 of the rotating electrical machine MG. The output shaft O2 of the rotating electrical machine MG therefore has its front end rotatably supported by the transmission/rotating electrical machine case H2 and its rear end (engine-side end)

rotatably supported by the pump body forming member f2. The second gear G2, on the other side, has its front side rotatably supported by the pump body forming member f2 and its rear side rotatably supported by the clutch/damper case H1.

The hybrid drive device HV of the present application is generally structured as described above. Hereinafter, the hybrid drive device HV of the present application will be described in detail from the drive device input shaft I1 side.

(Damper)

The damper D includes a drive plate d1 connected to a crankshaft, which that is an engine output shaft O1, a first driven plate d2 connected to the drive plate d1 at a position close to an outer-diameter end of the drive plate d1, and a second driven plate d4 connected to the drive device input shaft I1 through a boss portion d3. The first driven plate d2 has a forked portion d6 on the inner-diameter side, which has a downward U-shaped cross section opening, and the second driven plate d4 fits in the forked portion d6. A plurality of damper springs d5 are evenly dispersedly disposed in a circumferential direction between the forked portion d6 and the second driven plate d4. Driving force can thus be transmitted to the drive device input shaft I1 while absorbing rotational vibration transmitted from the engine output shaft O1 by the damper springs d5.

As can be seen from FIG. 2, the boss portion d3 of the damper D has a U-shaped cross section, and a recess w1 of the separation wall SW enters at least an inner-diameter-side part of the forked portion d6 of the first driven plate d2.

(Drive Device Input Shaft)

The drive device input shaft I1 is an input member of the hybrid drive device HV of the present application. As described above, rotational drive force generated by the engine EG is transmitted to the drive device input shaft I1 with the rotational vibration absorbed. The drive device input shaft I1 has the following relation with a transmission input shaft I2 serving as an intermediate shaft in the present application: the drive device input shaft I1 and the transmission input shaft I2 are coaxial (this shaft center is referred to as a first shaft center Z1). As shown in FIG. 2, a transmission-side end of the drive device input shaft I1 enters the transmission input shaft I2, and the drive device input shaft I1 and the transmission input shaft I2 are structured so as to be rotatable relative to each other.

A clutch drum connecting portion i1 is provided in the vicinity of an output end of the drive device input shaft I1. A clutch drum c1 including a plurality of friction partner plates p1 at its outer-diameter-side end is connected to the drive device input shaft I1 so as to rotate integrally with the input shaft I1.

An oil passage i2 is provided in the transmission-side end of the drive device input shaft I1. Operating oil can be supplied to and discharged from the inside of the first gear G1 through the oil passage i2 and the back side of a piston c3 through a hole provided in the clutch drum c1, respectively.

(Rotating Electrical Machine)

The rotating electrical machine MG is formed by a rotor m1 and a stator m3 having a coil m2. The rotor m1 is formed by a plurality of laminated plates m4 having a permanent magnet embedded therein, and a rotor support member m5 fixing and supporting the laminated plates m4 arranged in an axial direction, and fixed to the output shaft O2.

The rotating electrical machine MG includes the rotor m1 and the stator m3 around a second shaft center Z2 different from the first shaft center Z1 described above. The rotor m1 is supported by the transmission/rotating electrical machine case H2 and the above-described fixing member F through a bearing b so as to be rotatable around the second shaft center Z2. The output shaft O2 of the rotating electrical machine MG is extended toward the first gear side (engine side) and the second gear G2 is provided at the end of the output shaft O2.

A plurality of stator cores m6 are fixed to the transmission/rotating electrical machine case H2 so as to face the laminated plates m4 with a small space therebetween. The coil m2 is wound around the stator cores m6 so as to form the stator m3.

As can be seen from FIGS. 1 and 2, in an exemplary embodiment of the present application, both the plurality of laminated plates m4 of the rotor m1 and the plurality of stator cores m6 have a longer width in the direction of the second shaft center Z2 and a shorter thickness in the radial direction in their cross-sectional shape. Since there is a certain degree of width in the axial direction, the rotating electrical machine output has a predetermined value. It should be noted that, in the present application, the reduction mechanism RS is provided between the output shaft O2 of the rotating electrical machine MG and the input shaft I2 of the transmission SC, as described above. The occupied space of the rotating electrical machine MG is therefore significantly smaller than that in the case where such a reduction mechanism RS is not provided.

A resolver stator r1 and a resolver rotor r2 are disposed on the fixed member F and the output shaft O2 of the rotating electrical machine MG, respectively. A resolver R is formed by the resolver stators r1 and r2 so that the rotational position of the rotating electrical machine MG can be detected.

(Drive Transmission from the Rotating Electrical Machine and the Drive Device Input Shaft to the Transmission Input Shaft)

In the hybrid drive device HV of the present application, the reduction mechanism RS for reducing rotation of the rotating electrical machine MG and transmitting the reduced rotation to the transmission input shaft I2 is provided between the output shaft O2 of the rotating electrical machine MG and the transmission input shaft I2. On the other hand, the clutch C capable of connecting/disconnecting drive transmission between the drive device input shaft I1 and the transmission input shaft I2 is provided between the drive device input shaft I1 and the transmission input shaft I2. The first gear G1 that is unique to the present application is shared to form the reduction mechanism RS and the clutch C.

(Reduction Mechanism and Second Gear)

In this example, the reduction mechanism is formed by the second gear G2 provided on the output shaft O2 of the rotating electrical machine MG and the first gear G1 having a gear portion g that meshes with the second gear G2.

As shown in FIG. 2, the second gear G2 is structured to rotate around the second shaft center, and a small pitch diameter is selected for the second gear G2. On the other hand, the first gear G1 includes an input-shaft-side radially extending portion g1 having its inner-diameter-side part rotatably supported by the drive device input shaft I1 and extending in the radial direction, and an intermediate-shaft-side radially extending portion g2 having its inner-diameter-side part connected to the transmission input shaft I2 and extending in the radial direction. Moreover, the first gear G1 includes a connecting portion g3 that connects the respective outer-diameter sides of the input-shaft-side radially extending portion g1 and the intermediate-shaft-side radially extending portion g2 in the axial direction. The gear portion g that meshes with the second gear G2 is formed in an outer-diameter part of the connecting portion g. The gear portion g therefore has a large pitch diameter, and sufficient speed reduction can be implemented by the relation of the pitch diameter between the second gear G2 and the gear portion g3.

The first gear G1 is rotatable relative to the drive device input shaft I1 and is spline-connected to the transmission input shaft I2 so as to rotate integrally with the transmission input shaft I2. Rotation of the rotating electrical machine MG reduced by the reduction mechanism RS described above is therefore transmitted to the transmission input shaft I2.

A first rotational bearing B1 fixed to the separation wall SW supports the first gear G1 on the engine side of the drive device input shaft I1, and a second rotational bearing B2 fixed to the fixing member F supports the first gear G1 on the transmission side of the drive device input shaft I1.

(Clutch)

As can be seen from FIG. 2, regarding the first gear G1, the clutch drum c1 connected to the drive device input shaft I1 is inserted into the internal space surrounded by the input-shaft-side radially extending portion g1, intermediate-shaft-side radially extending portion g2, and connecting portion g3 described above. The intermediate-shaft-side radially extending portion g2 of the first gear G1 is structured as a clutch hub c2. The piston c3 is disposed between the clutch drum c1 and the clutch hub c2. The friction partner plates p1 are disposed to the clutch drum c1 by spline fitting, and friction plates p2 are disposed to the clutch hub c2 by spline fitting. The piston c3 is moved in the axial direction by an oil pressure so that engagement and disengagement of the clutch C can be implemented. In this example, in order to implement an engaged state, hydraulic fluid for engagement is supplied to the back side (engine side) of the piston c3 through the transmission input shaft I2 and the oil passage i2 formed in the drive device input shaft I1 as shown by the arrows, and the hydraulic fluid remaining on the front side (transmission side) of the piston c3 is discharged through the drive device input shaft I1 and an outer-diameter part i3 of the transmission input shaft I2. Disengagement of the clutch C, on the other hand, is implemented by moving the hydraulic fluid in the opposite direction to that described above.

As described above, in this hybrid drive device HV, the shaft center (first shaft center Z1) of the drive device input shaft I1 and transmission input shaft I2 is different from the shaft center (second shaft center Z2) of the rotating electrical machine MG, and rotation of the rotating electrical machine MG is reduced and transmitted to the transmission input shaft I2. The clutch C is formed by using a part of, and inside of, the first gear G1 that implements such reduction of rotation.

(Arrangement of the First Rotational Bearing and the Second Rotational Bearing)

As described above, the first gear G1 is supported on both sides in the axial direction by the first rotational bearing B1 and the second rotational bearing B2. These rotational bearings B1 and B2 are arranged by the following method so as to reduce the front-rear length (left-right length in FIG. 1) of the hybrid drive device HV.

As shown in FIG. 2, the hybrid drive device HV includes a damper D between the engine EG and the drive device input shaft I1. The boss portion d3 of the damper D is relatively long in the radial direction, and the inner-diameter-side part of the boss portion d3 has a U-shape protruding toward the engine side (the input-end side of the input shaft). The inner-diameter-side part of the separation wall SW described above has a recess w1 protruding toward the engine side (the input-end side of the input shaft), and the first rotational bearing B1 is fixed in the recess w1. The recess w1 is formed at such a position that overlaps a part (forked portion d6) of the damper D in the axial direction, and disposed at a position on the inner-diameter side of a part of the forked portion d6. Reduction in size in the axial direction is therefore achieved while supporting the first gear G1 by the separation wall SW with the first rotational bearing B1.

Moreover, the first gear G1 is structured so that a part of the first gear G1 (intermediate-shaft-side radially extending portion g2) serves as a clutch hub c2. The intermediate-shaft-side radially extending portion g2 has its inner-diameter part located on the engine side, and the friction plates p2 and the friction partner plates p1 are disposed on the transmission side on the outer-diameter part of the intermediate-shaft-side radially extending portion g2. A substantial engaging function portion (friction plates p2 and friction partner plates p1) of the clutch C is thus located on the more transmission side than the inner-diameter part of the intermediate-shaft-side radially extending portion g2. In other words, the second rotational bearing B2 is disposed at such a position that overlaps the axial position of the friction plates of the clutch C in the axial direction. Moreover, the second rotational bearing B2 is disposed on the more inner-diameter side than the disposed position of the friction plates p2 and friction partner plates p1. The second rotational bearing B2 is thus disposed on the inner-diameter side of the engaging function portion of the clutch C, whereby reduction in size in the axial direction is achieved while supporting the first gear G1 by the fixing member F.

(Transmission)

A known stepped transmission and a known continuously variable transmission can be used as the transmission SC. In this example, a transmission for shifting input rotation received from a transmission input member (the transmission input shaft I2 described above) to one of six speeds and outputting the shifted rotation from a transmission output member is shown as an example. In this example, a transmission output gear OG provided in the middle in the axial direction (left-right direction in FIG. 1) of the transmission SC is used as the transmission output member. The transmission output gear OG meshes with the counter gear CG on the counter shaft A1. A pinion P disposed on the counter shaft A1 meshes with a differential ring gear RG of the differential gear DG. By using this structure, drive is transmitted from the differential gear DG to the driving wheels W through an axle DS. In the present application, a portion from the transmission SC to the differential gear DG is referred to as a shift output mechanism.

FIG. 3 shows a positional relation of the output shaft O2 of the rotating electrical machine MG, the drive device input shaft I1 provided coaxially with the engine EG, the counter shaft A1, and the differential gear DG, when viewed from the left side in FIG. 1. In FIG. 3, in addition to the first shaft center Z1 and second shaft center Z2 described above, the shaft center of the counter shaft A1 is shown as a third shaft center Z3 and the shaft center of the differential ring gear RG is shown as a fourth axial shaft Z4. As can be seen from the figure, the hybrid drive device HV of the present application is structured to be compact regarding a width in the up-down direction of the drive device in addition to the front-back direction of the drive device as shown in FIGS. 1 and 2.

Other Embodiments

In the above embodiment, the transmission is a stepped transmission SC. However, the structure of the present application is applicable even when a continuously variable transmission for continuously shifting the gear ratio is used as the transmission.

In the above embodiment, the hybrid drive device of the present application is used in a FF vehicle. However, the hybrid drive device of the present application may be used in a FR (front engine-rear wheel drive) vehicle.

In the above embodiment, the clutch hub of the clutch for connecting/disconnecting drive transmission between the engine and the transmission input shaft is used in common as an input member to the transmission input shaft. However, an engine-side input system from the engine to the transmission input shaft through the clutch and an input system from the rotating electrical machine to the transmission input shaft through the reduction mechanism may be separate from each other up to the transmission input shaft.

In a hybrid drive device including an engine and a rotating electrical machine as driving sources, for obtaining driving force from one or both of the driving sources and transmitting the driving force to driving wheels after shifting in a transmission, sufficient driving force can be obtained even when a relatively small rotating electrical machine is used. Moreover, the hybrid drive device can be reduced in size as much as possible.

What is claimed is:

1. A hybrid drive device, comprising:
    an input shaft connected to an engine;
    a rotating electrical machine;
    a shift output mechanism for shifting rotation of an intermediate shaft provided coaxially with the input shaft and transmitting the resultant rotation to an axle; and
    a clutch for connecting and disconnecting a drive transmission between the input shaft and the intermediate shaft,
    wherein an output shaft of the rotating electrical machine and the input shaft are disposed at different shaft center positions,
    wherein a first gear, which is provided coaxially with the input shaft, meshes with a second gear, which is provided on the output shaft of the rotating electrical machine, to reduce rotation and transmit the reduced rotation to the intermediate shaft, and
    wherein at least a part of the clutch is disposed at an inner-diameter-side position so as to overlap a gear portion of the first gear in an axial direction.

2. The hybrid drive device according to claim 1, wherein at least a part of the first gear forms the clutch.

3. The hybrid drive device according to claim 1, wherein the first gear comprises
    an input-shaft-side radially extending portion having its inner-diameter-side part rotatably supported by the input shaft and extending in a radial direction,
    an intermediate-shaft-side radially extending portion having its inner-diameter-side part connected to the intermediate shaft and extending in a radial direction, and
    a connecting portion that connects respective outer-diameter sides of the input-shaft-side radially extending portion and the intermediate-shaft-side radially extending portion to each other in an axial direction, and
    wherein the portion of the first gear, which meshes with the second gear is formed in an outer-diameter part of the connecting portion.

4. The hybrid drive device according to claim 3, wherein a clutch drum connected to the input shaft is inserted into an internal space surrounded by the input-shaft-side radially extending portion, the intermediate-shaft-side radially extending portion, and the connecting portion,
    wherein the intermediate-shaft-side radially extending portion is structured as a clutch hub, and
    wherein a friction plate and a piston are disposed between the clutch drum and the clutch hub, where the clutch is formed.

5. The hybrid drive device according to claim 1, further comprising:
    a separation wall through, which the input shaft penetrates, for dividing a space within a case in an axial direction; and
    a fixing member different from the separation wall, the fixing member being provided on an end of the input shaft nearer the output side than the separation wall, wherein
    the first gear has one side supported by a first rotational bearing fixed to the separation wall and its other side supported by a second rotational bearing fixed to the fixing member.

6. The hybrid drive device according to claim 5, further comprising a damper for absorbing rotational vibration of the engine and transmitting power to the input shaft, wherein
    the first rotational bearing is provided in a recess formed in the separation wall and said first rotational bearing protrudes toward an input end side of the input shaft, and
    the recess is provided at an inner-diameter-side position, which overlaps a part of the damper in an axial direction.

7. The hybrid drive device according to claim 5, wherein the second rotational bearing is provided at a position on an inner-diameter side of the first gear so as to overlap the friction plate of the clutch in an axial direction.

8. The hybrid drive device according to claim 5, wherein the separation wall is structured so as to be insertable into the case from a side of an engine mounting face, and is fixed to the case in an axial direction.

9. The hybrid drive device according to claim 1, wherein the axle extending parallel to the input shaft is provided as a shaft separate from the input shaft.

10. The hybrid drive device according to claim 2, wherein the first gear comprises
    an input-shaft-side radially extending portion having its inner-diameter-side part rotatably supported by the input shaft and extending in a radial direction,
    an intermediate-shaft-side radially extending portion having its inner-diameter-side part connected to the intermediate shaft and extending in a radial direction, and
    a connecting portion that connects respective outer-diameter sides of the input-shaft-side radially extending portion and the intermediate-shaft-side radially extending portion to each other in an axial direction, and
    wherein the portion of the first gear that meshes with the second gear is formed in an outer-diameter part of the connecting portion.

11. The hybrid drive device according to claim 10,
    wherein a clutch drum connected to the input shaft is inserted into an internal space surrounded by the input-shaft-side radially extending portion, the intermediate-shaft-side radially extending portion, and the connecting portion,
    wherein the intermediate-shaft-side radially extending portion is structured as a clutch hub, and
    wherein a friction plate and a piston are disposed between the clutch drum and the clutch hub, where the clutch is formed.

12. The hybrid drive device according to claim 11, further comprising:

a separation wall through which the input shaft penetrates, and which divides a space within a case in an axial direction; and a fixing member different from the separation wall, the fixing member being provided on a side of the input side nearer the output end than the separation wall, wherein the first gear has one side supported by a first rotational bearing fixed to the separation wall and the other side supported by a second rotational bearing fixed to the fixing member.

13. The hybrid drive device according to claim 12, further comprising:

a damper for absorbing rotational vibration of the engine and transmitting power to the input shaft, wherein the first rotational bearing is provided in a recess formed in the separation wall and said first rotational bearing protrudes toward an input end side of the input shaft, and wherein the recess is provided at an inner-diameter-side position which overlaps a part of the damper in an axial direction.

14. The hybrid drive device according to claim 13, wherein the second rotational bearing is provided at a position on an inner-diameter side of the input shaft, which overlaps the friction plate of the clutch in an axial direction.

15. The hybrid drive device according to claim 14, wherein the separation wall is structured so as to be insertable into the case from a side of an engine mounting face, and is fixed to the case in an axial direction.

16. The hybrid drive device according to claim 15, wherein the axle extending parallel to the input shaft is provided as a shaft separate from the input shaft.

17. The hybrid drive device according to claim 2, further comprising:

a separation wall through which the input shaft penetrates, for dividing a space within a case in an axial direction; and a fixing member different from the separation wall, the fixing member being provided on a side of the input shaft nearer the output end side than the separation wall, wherein the first gear has one side supported by a first rotational bearing fixed to the separation wall and its other side supported by a second rotational bearing fixed to the fixing member.

18. The hybrid drive device according to claim 3, further comprising:

a separation wall through which the input shaft penetrates, for dividing a space within a case in an axial direction; and a fixing member different from the separation wall, the fixing member being provided on an side of the input shaft nearer the output end than the separation wall, wherein the first gear has one side supported by a first rotational bearing fixed to the separation wall and its other side supported by a second rotational bearing fixed to the fixing member.

19. The hybrid drive device according to claim 4, further comprising:

a separation wall through which the input shaft penetrates, for dividing a space within a case in an axial direction; and a fixing member different from the separation wall, the fixing member being provided on a side of the input shaft nearer the output end than the separation wall, wherein the first gear has one side supported by a first rotational bearing fixed to the separation wall and its other side supported by a second rotational bearing fixed to the fixing member.

20. The hybrid drive device according to claim 10, further comprising:

a separation wall through which the input shaft penetrates, for dividing a space within a case in an axial direction; and a fixing member different from the separation wall, the fixing member being provided on a side of the input shaft nearer the output end than the separation wall, wherein the first gear has one side supported by a first rotational bearing fixed to the separation wall and its other side supported by a second rotational bearing fixed to the fixing member.

* * * * *